2,736,647

N-1-NAPHTHYLPHTHALAMIC ACID HERBICIDAL COMPOSITIONS

Allen E. Smith, Oxford, Albert W. Feldman, North Haven, and Gracie M. Stone, Naugatuck, Conn., assignors to United States Rubber Company, New York, N. Y., a corporation of New Jersey No Drawing. Application October 27, 1954, Serial No. 465,152

15 Claims. (Cl. 71—2.6)

This invention relates to improvements in N-1-naphthylphthalamic acid herbicidal compositions.

Pre-emergence herbicides are applied to the soil surface before emergence of weeds, generally immediately after planting the seeds of the agronomic crop.

A basis for the action of pre-emergence hebicides is the difference in depth between the planted crop seeds and the weed seeds on the surface of the soil. Crop seeds are generally planted one to three inches deep and are somewhat protected from chemicals applied to the soil surface, while weed seeds generally germinate only in the top one-fourth inch of soil and are thus subject to much higher concentrations of the chemical during the germination period. To maintain as high a concentration of herbicide as possible near the soil surface, and also to avoid injury to the seeded crop which may be semi-sensitive to the herbicide, it is desirable to minimize downward movement of the chemical in the soil during rains or irrigation. Compounds of very low solubility do not necessarily resist leaching. For example, N-1-naphthylphthalamic acid and N-1-naphthylphthalimide are both substantially insoluble in water (less than 0.05% at 15° C.) yet the acid is quite mobile in soil while the imide resists leaching very well.

The purpose of the present invention is to decrease the soil mobility of phthalamic acid herbicide, in order to increase residual weed control by maintaining a high concentration of the herbicide at the soil surface under wet conditions, and to minimize possible injury to the more deeply seeded crops.

We have found that occluding the N-1-naphthylphthalamic acid acid herbicide in other organic acids having a solubility in water less than 0.2% at 15° C. greatly reduces the leaching tendency of the herbicide when applied to the soil surface.

Such other organic acids may be the higher fatty acids, i. e. aliphatic acids having 8 to 24 carbon atoms, e. g. caprylic, 2-ethylhexanoic, pelargonic, capric, undecylic, lauric, tridecylic, myristic, pentadecylic, palmitic, margaric, stearic, arachidic, behenic, carnaubic, oleic, undecylenic, brassidic, linoleic, and linolenic acids; alicyclic acids, i. e. rosin acids, e. g. abietic acid (including the isomeric sapinic and pimaric acids), dehydroabietic acid, disproportionated abietic acid, dehydrogenated abietic acid, and dimerized and other polymerized abietic acids; and aromatic acids, i. e. alkylbenzoic acids having 2 to 18 carbon atoms in the alkyl radical, e. g., o-, m- and p-alkylbenzoic acids in which the alkyl group is straight or branched chain; N-alkyl phthalamic acids having 1 to 18 carbon atoms in the alkyl radical, e. g. where the alkyl group is straight or branched chain; and monoalkyl esters of phthalic acid having 1 to 18 carbon atoms in the alkyl radical, e. g. where the alkyl esterifying group is straight or branched chain. It is noted that these organic acids contain one free carboxyl group. The ratio of such other organic acid to the N-1-naphthylphthalamic acid in the herbicide formulation does not appear critical and will generally be in the range of 1:5 to 5:1, and preferably will be in the range of 1:3 to 3:1. Such other organic acid may be intimately mixed with the N-1-naphthylphthalamic acid in a variety of ways. The acids may be co-precipitated from an aqueous solution of a mixture of their alkali salts. The acids may be dissolved in a common solvent and the solvent evaporated. The N-1-naphthylphthalamic acid may be mixed into a melt of such other organic acid if it is of a lower melting point. The N-1-naphthylphthalamic acid may be formed by reaction of phthalic anhydride and 1-naphthylamine in the presence of such other organic acid in an organic solvent, and the solvent removed from the reaction mixture. The N-1-naphthylphthalamic acid and other organic acid may be further formulated with a surface-active agent, as where the herbicide is to be dispersed in water as in spray applications to the soil. Where the mixed acid herbicide is to be applied to the soil as a dust, the mixture of acids may be further admixed with a powdered solid carrier, such as the various mineral silicates, e. g. talc, pyrophillite and clays. If desired, the mixture of acids may be further admixed with powdered solid carriers, such as mineral silicates, together with a surface-active dispersing agent so that a readily wettable powder may be obtained which may be applied directly to the soil or which may be shaken up with water for spray or other liquid application to the soil. The mixture of N-1-naphthylphthalamic acid and other organic acid may be applied to the ground by the aerosol method. Such formulations may, if desired, also contain fertilizers, fungicides, insecticides and soil-conditioners.

The following examples illustrate the invention. All parts and percentages referred to herein are by weight.

Example I

The control or check herbicide formulation in Examples I to IV was a mixture of 95 parts of N-1-naphthylphthalamic acid and 5 parts of a non-herbicidal surface-active dispersing agent (condensation product of ethylene oxide with an alkylated phenol).

A herbicidal formulation was prepared according to the present invention as follows: An aqueous solution of equal parts of sodium N-1-naphthylphthalamate and sodium abietate was acidified with hydrochloric acid to coprecipitate the water-insoluble organic acids. The product was dried and ground with 4 parts of the non-herbicidal surface-active dispersing agent used in the control.

The two formulations were dispersed by stirring in water at concentrations of about 1.0 part of the active N-1-naphthylphthalamic acid per 1000 parts of water. The dispersions were watered on to the surface of 1" thick layers of conventional sandy loam soil in separate Buchner type funnels in amount corresponding to an application rate of about 4 lbs. of N-1-naphthylphthalamic acid per acre. An hour after treatment of the soil samples with the herbicidal samples (the time was found not to be critical) an amount equivalent to 1 inch rainfall was applied to the soil surfaces. The moisture content of the soil was reduced to field capacity by gravity and subsequent vacuum filtration. The filtrates were analyzed chemically to determine the amount of N-1-naphthylphthalamic acid herbicide removed. The percentage of the applied N-1-naphthylphthalamic acid washed through 1 inch of soil by 1" of water (i. e. percent leached) was then calculated. The percent of the applied N-1-naphthylphthalamic acid leached in the control dispersion of the herbicide was 58%. Other tests have shown that the percent of N-1-naphthylphthalamic acid leached is substantially the same for various application rates of the chemical. With the equivalent of a one-inch rain 50% to 60% of N-1-naphthylphthalamic acid is leached at various application rates from 2 to 8 pounds per acre. With the equivalent of a two-inch rainfall, the percent leaching at 2 to 8 pounds application rate is over 80%. The percent of the applied N-1-naphthylphthalamic acid leached in the second herbicidal formulation according to the present invention was 16%.

*Example II*

A herbicidal formulation was prepared according to the present invention as follows: 5 parts of N-1-naphthylphthalamic acid was added to 15 parts of molten stearic acid. One part of the same non-herbicidal surface-active agent used in Example I was added and the system was mixed well, then cooled and ground.

Tests were made with the above formulation and a control formulation similarly to Example I at application rate of about 4 lbs. of N-1-naphthylphthalamic acid per acre.

The result of the leaching test showed only 6% of the applied N-1-naphthylphthalamic acid leaching from the mixture with stearic acid according to the present invention, as compared to 58% of the N-1-naphthylphthalamic acid leached from the control formulation.

*Example III*

Herbicidal formulations were prepared according to the present invention as follows: 48 parts of N-1-naphthylphthalamic acid and 48 parts of p-tert.-butyl-benzoic acid were slurried in acetone and the acetone evaporated from the mixture. The resultant solid was ground with 4 parts of the non-herbicidal surface-active agent used in Example I. In a similar manner, 48 parts of N-1-naphthylphthalamic acid were slurried in acetone with 48 parts of N-dodecyl phthalamic acid, the acetone evaporated and the product ground with 4 parts of the non-herbicidal surface-active agent. In a third formulation, according to the present invention, 48 parts of the N-1-naphthylphthalamic acid were similarly slurried in acetone with 48 parts of monocapryl ester of phthalic acid, the acetone evaporated, and the dried product ground with 4 parts of the non-herbicidal surface-active agent.

In tests similar to Example I with the three formulations according to the present invention applied at an application rate of 4 lbs. per acre similar to the control, it was found that the percent N-1-naphthylphthalamic acid leached in the formulation containing the p-tert.-butyl benzoic acid was 9%, and in the formulation containing the N-dodecyl phthalamic acid was 25%, and in the formulation containing the monocapryl ester of phthalic acid was 12% as compared to 58–59% leached in the case of the control formulation.

*Example IV*

Herbicidal formulations were prepared according to the present invention as follows: Phthalic anhydride (26 parts) and 1-naphthylamine (24 parts) were allowed to react in acetone reaction medium in the presence of commercial rosin acid (20 parts), talc (25 parts), and the non-herbicidal surface-active agent used in Example I (5 parts). The acetone was removed and the product ground. A second formulation was made in the same manner by substituting 20 parts of stearic acid for the rosin acid.

In tests similar to Example I with the two formulations according to the present invention applied at an application rate of 4 lbs. per acre, similar to the control, it was found that the percent N-1-naphthylphthalamic acid leached in the formulation containing the rosin acid was 10%, and in the formulation containing the stearic acid was 17%, as compared to 59% leaching in the case of the control formulation.

Having thus described our invention, what we claim and desire to protect by Letters Patent is:

1. A herbicidal composition comprising a phytotoxic concentration of N-1-naphthylphthalamic acid occluded in another organic acid having a solubility in water less than 0.2% at 15° C., the ratio of N-1-naphthylphthalamic acid to the other organic acid being in the range of 1:5 to 5:1.

2. A herbicidal composition comprising a phytotoxic concentration of N-1-naphthylphthalamic acid occluded in another organic acid selected from the group consisting of fatty acids having 8 to 24 carbon atoms, rosin acids, alkyl benzoic acids having 2 to 18 carbon atoms in the alkyl radical, N-alkyl phthalamic acids having 1 to 18 carbon atoms in the alkyl radical and monoalkyl esters of phthalic acid having 1 to 18 carbon atoms in the radical, the ratio of N-1-naphthylphthalamic acid to the other organic acid being in the range from 1:5 to 5:1.

3. A herbicidal composition comprising a phytotoxic concentration of N-1-naphthylphthalamic acid occluded in stearic acid, the ratio of N-1-naphthylphthalamic acid to the stearic acid being in the range from 1:5 to 5:1.

4. A herbicidal composition comprising a phytotoxic concentration of N-1-naphthylphthalamic acid occluded in a rosin acid, the ratio of N-1-naphthylphthalamic acid to the rosin acid being in the range from 1:5 to 5:1.

5. A herbicidal composition comprising a phytotoxic concentration of N-1-naphthylphthalamic acid occluded in p-tert.-butyl benzoic acid, the ratio of N-1-naphthylphthalamic acid to the p-tert.-butyl benzoic acid being in the range from 1:5 to 5:1.

6. A herbicidal composition comprising a phytotoxic concentration of N-1-naphthylphthalamic acid occluded in N-dodecyl phthalamic acid, the ratio of N-1-naphthylphthalamic acid to the N-dodecyl phthalamic acid being in the range from 1:5 to 5:1.

7. A herbicidal composition comprising a phytotoxic concentration of N-1-naphthylphthalamic acid occluded in the monocapryl ester of phthalic acid, the ratio of N-1-naphthylphthalamic acid to the monocapryl ester of phthalic acid being in the range from 1:5 to 5:1.

8. A herbicidal composition comprising a phytotoxic concentration of N-1-naphthylphthalamic acid occluded in another organic acid having a solubility in water less than 0.2% at 15° C., the ratio of N-1-naphthylphthalamic acid to the other organic acid being in the range of 1:5 to 5:1, said composition containing a surface-active wetting agent.

9. A herbicidal composition comprising a phytotoxic concentration of N-1-naphthylphthalamic acid occluded in another organic acid having a solubility in water less than 0.2% at 15° C., the ratio of N-1-naphthylphthalamic acid to the other organic acid being in the range of 1:5 to 5:1, said composition containing a powdered solid carrier.

10. A herbicidal composition comprising a phytotoxic concentration of N-1-naphthylphthalamic acid occluded in another organic acid having a solubility in water less than 0.2% at 15° C., the ratio of N-1-naphthylphthalamic acid to the other organic acid being in the range of 1:5 to 5:1, said composition containing a surface-active wetting agent and a powdered solid carrier.

11. A herbicidal composition comprising a phytotoxic concentration of N-1-naphthylphthalamic acid occluded in another organic acid selected from the group consisting of fatty acids having 8 to 24 carbon atoms, rosin acids, alkyl benzoic acids having 2 to 18 carbon atoms in the alkyl radical, N-alkyl phthalamic acids having 1 to 18 carbon atoms in the alkyl radical and monoalkyl esters of phthalic acid having 1 to 18 carbon atoms in the radical, the ratio of N-1-naphthylphthalamic acid to the other organic acid being in the range of 1:5 to 5:1, said composition containing a surface-active wetting agent.

12. A herbicidal composition comprising a phytotoxic concentration of N-1-naphthylphthalamic acid occluded in another organic acid selected from the group consisting of fatty acids having 8 to 24 carbon atoms, rosin acids, alkyl benzoic acids having 2 to 18 carbon atoms in the alkyl radical, N-alkyl phthalamic acids having 1 to 18 carbon atoms in the alkyl radical and monoalkyl esters of phthalic acid having 1 to 18 carbon atoms in the radical, the ratio of N-1-naphthylphthalamic acid to the other organic acid being in the range of 1:5 to 5:1, said composition containing a powdered solid carrier.

13. A herbicidal composition comprising a phytotoxic concentration of N-1-naphthylphthalamic acid occluded in another organic acid selected from the group consisting of fatty acids having 8 to 24 carbon atoms, rosin acids, alkyl benzoic acids having 2 to 18 carbon atoms in the alkyl radical, N-alkyl phthalamic acids having 1 to 18 carbon atoms in the alkyl radical and monoalkyl esters of phthalic acid having 1 to 18 carbon atoms in the radical, the ratio of N-1-naphthylphthalamic acid to the other organic acid being in the range of 1:5 to 5:1, said composition containing a surface-active agent and a powdered solid carrier.

14. The method of controlling weeds in soil which comprises treating the soil before emergence of weeds with a phytotoxic amount of a composition comprising N-1-naphthylphthalamic acid occluded in another organic acid having a solubility in water less than 0.2% at 15° C., the ratio of N-1-naphthylphthalamic acid to the other organic acid being in the range of 1:5 to 5:1.

15. The method of controlling weeds in soil which comprises treating the soil before emergence of weeds with a phytotoxic amount of a composition comprising N-1-naphthylphthalamic acid occluded in another organic acid selected from the group consisting of fatty acids having 8 to 24 carbon atoms, rosin acids, alkyl benzoic acids having 2 to 18 carbon atoms in the alkyl radical, N-alkyl phthalamic acids having 1 to 18 carbon atoms in the alkyl radical and monoalkyl esters of phthalic acid having 1 to 18 carbon atoms in the radical, the ratio of N-1-naphthylphthalamic acid to the other organic acid being in the range of 1:5 to 5:1.

References Cited in the file of this patent

UNITED STATES PATENTS

| 1,692,996 | Richardson | Nov. 27, 1928 |
| 2,556,665 | Smith et al. | June 12, 1951 |

OTHER REFERENCES

Chemical Abstracts, vol. 47 (1953) Col. 1197b abstract of article by Pacheco.